United States Patent [19]
Hill et al.

[11] Patent Number: 5,433,364
[45] Date of Patent: Jul. 18, 1995

[54] CARD PACKAGE PRODUCTION SYSTEM WITH BURSTER AND CARRIER VERIFICATION APPARATUS

[75] Inventors: Jeffery L. Hill, Mundelein; Gregory S. Hill, Lake Zurich; Gary Zuck, Prospect Heights; Fred J. Kassabian, Arlington Heights, all of Ill.

[73] Assignee: Dynetics Engineering Corporation, Lincolnshire, Ill.

[21] Appl. No.: 337,126

[22] Filed: Nov. 10, 1994

Related U.S. Application Data

[63] Continuation of Ser. No. 36,159, Mar. 24, 1993, abandoned, which is a continuation-in-part of Ser. No. 19,865, Feb. 19, 1993, abandoned.

[51] Int. Cl.⁶ .............................................. B26D 1/547
[52] U.S. Cl. .................................... 225/96; 3/614; 3/651.1
[58] Field of Search ............... 83/651.1, 614, 72; 225/100, 96, 94

[56] References Cited

U.S. PATENT DOCUMENTS

| | | | |
|---|---|---|---|
| 3,861,299 | 1/1975 | Drillick | 101/18 |
| 4,034,210 | 7/1977 | Hill et al. | 235/61.12 N |
| 4,088,216 | 5/1978 | La Manna et al. | 400/130 |
| 4,180,338 | 12/1979 | La Manna et al. | 400/582 |
| 4,194,685 | 3/1980 | Hill et al. | 235/375 |
| 4,271,012 | 6/1981 | La Manna et al. | 209/653 |
| 4,384,196 | 5/1983 | McCumber et al. | 235/375 |
| 4,384,711 | 5/1983 | Gabel et al. | 271/129 |
| 4,420,819 | 12/1983 | Price et al. | 364/900 |
| 4,429,217 | 1/1984 | Hill et al. | 235/380 |
| 4,686,898 | 8/1987 | La Manna et al. | 101/18 |
| 4,688,785 | 8/1987 | Nubson et al. | 271/266 |
| 4,755,069 | 7/1988 | La Manna et al. | 400/130 |
| 4,784,059 | 11/1988 | La Manna et al. | 101/18 |
| 4,789,420 | 12/1988 | La Manna et al. | 156/540 |
| 4,866,545 | 9/1989 | La Manna et al. | 360/53 |
| 4,900,168 | 2/1990 | La Manna et al. | 400/130 |

*Primary Examiner*—Kenneth E. Peterson
*Attorney, Agent, or Firm*—Potthast & Ring

[57] ABSTRACT

An embossed card package production system (10) with a printer (48) supplied with a plurality of interconnected card carrier forms (26) for receipt of corresponding cards (30) inserted into the carriers at a card inserting apparatus (24) to form card packages, a form bursting apparatus (36) having a cutting member (240) with a cutting portion tautly extending between and partially wrapped about a pair of rotary members (242) and (244), a drive motor (248) interconnected with a chain linkage (250) for moving the cutting member (240) across preweakened lines (252) through and across end ones (26A) of the interconnected card carrier forms (26) to separate individual card carrier forms (26A) from the interconnected card carrier forms, a code sensor (38) mounted to an elongate sliding bar (290) for reading machine readable indicia (231) printed on the body of the carrier form (26) in back and forth directions opposite directions across the end ones (26A) of the interconnected carrier forms (26) as the forms are separated by the movement of the cutting member (240).

18 Claims, 12 Drawing Sheets

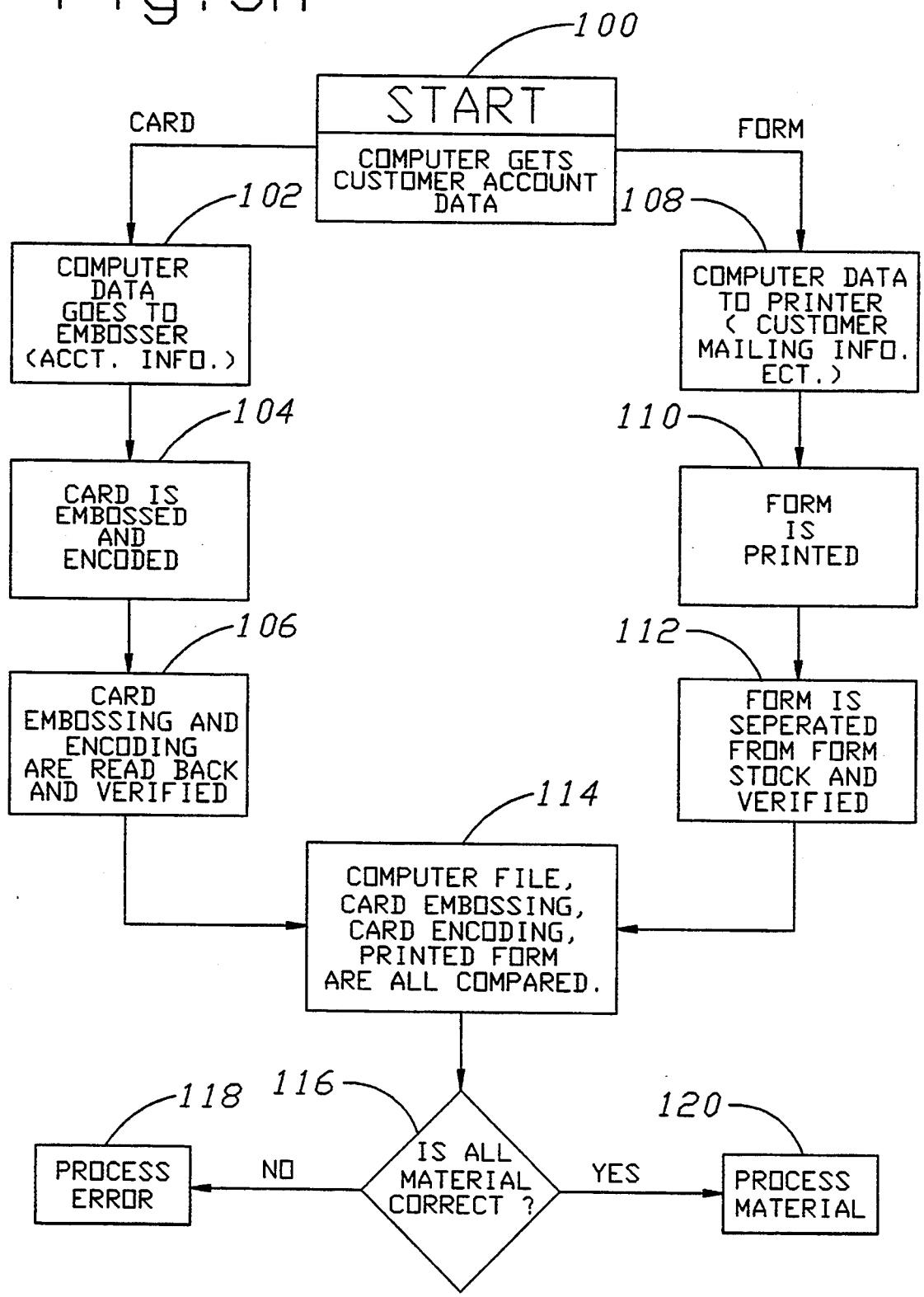

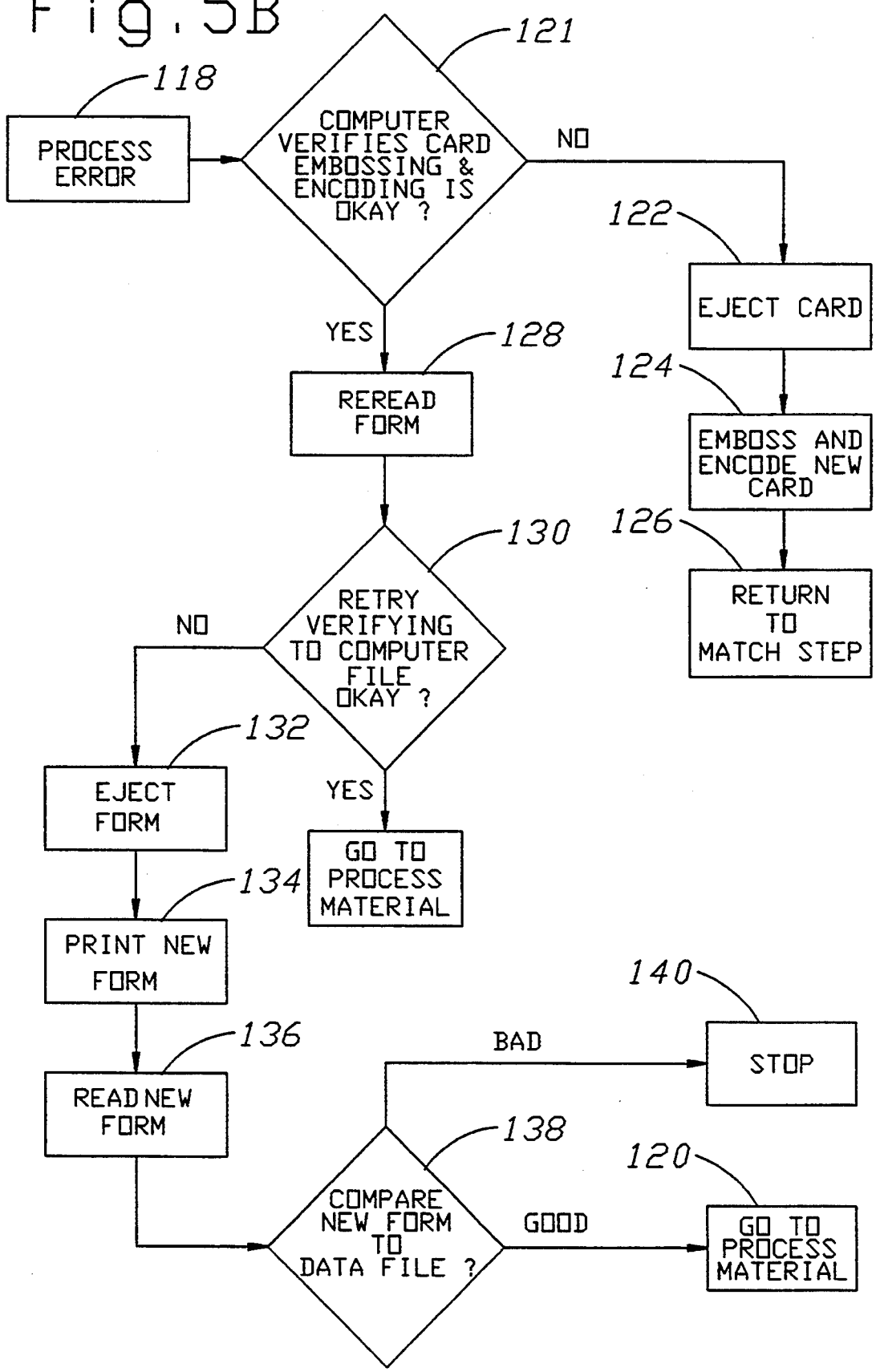

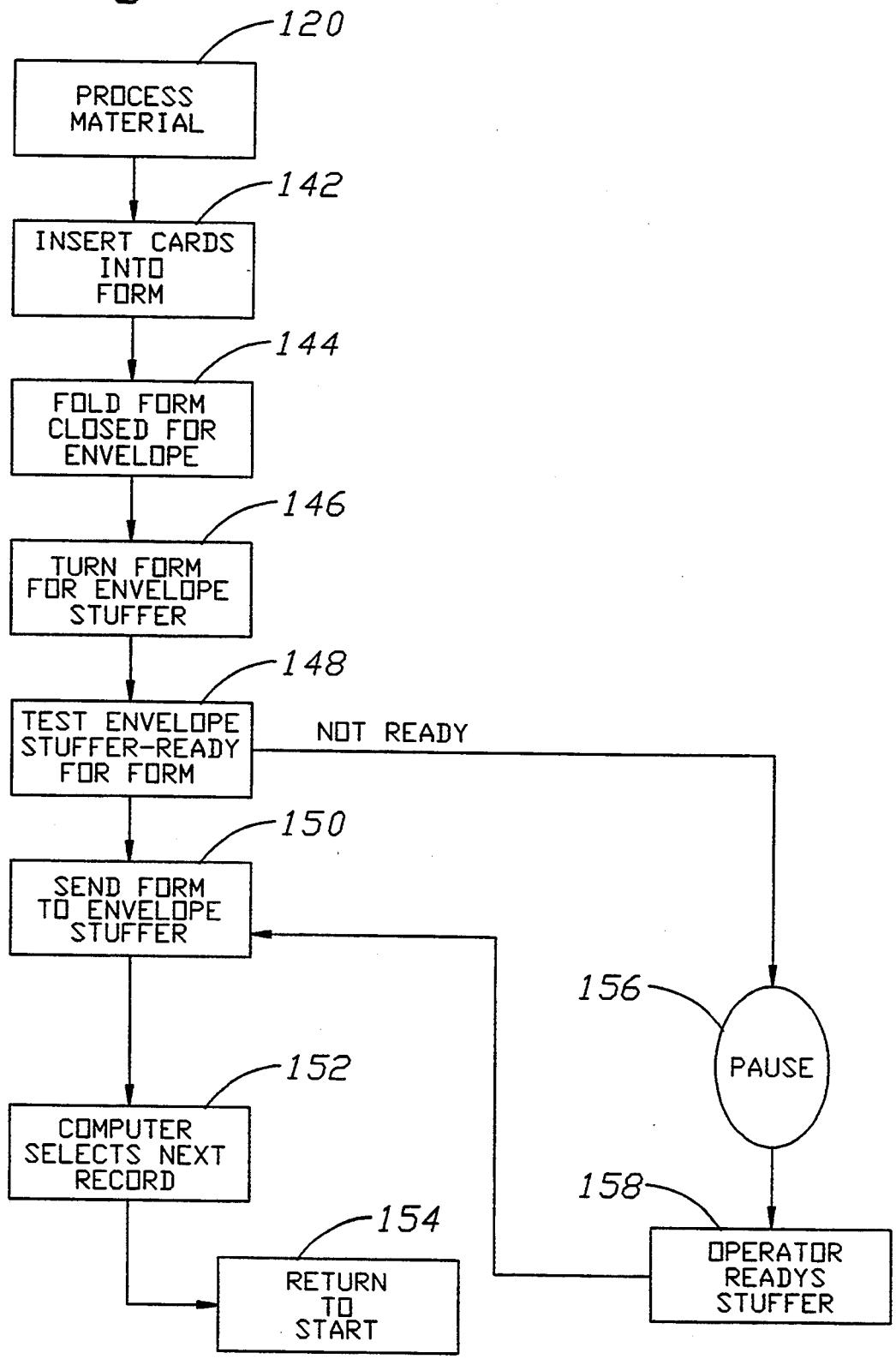

FROM PRINTER

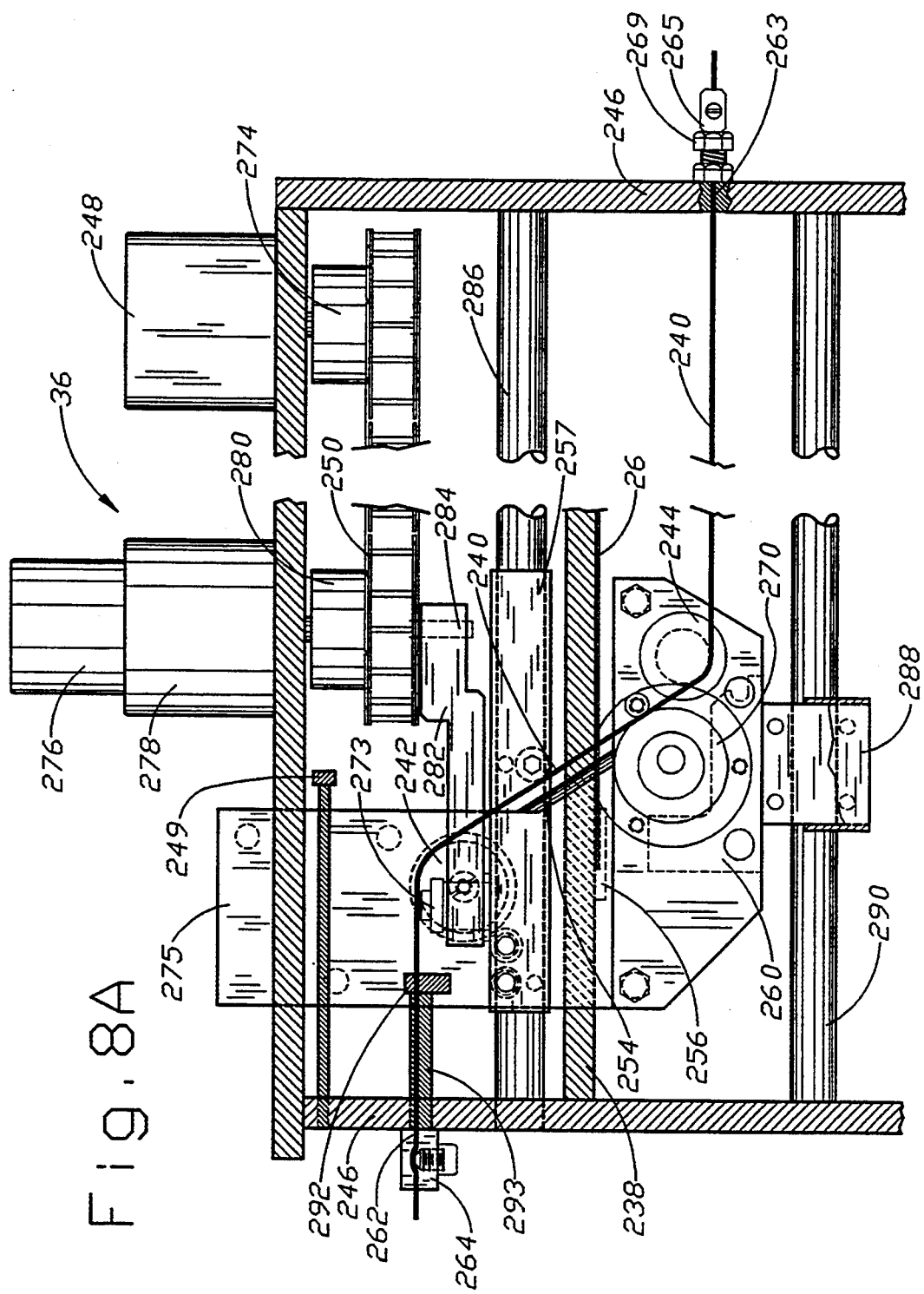

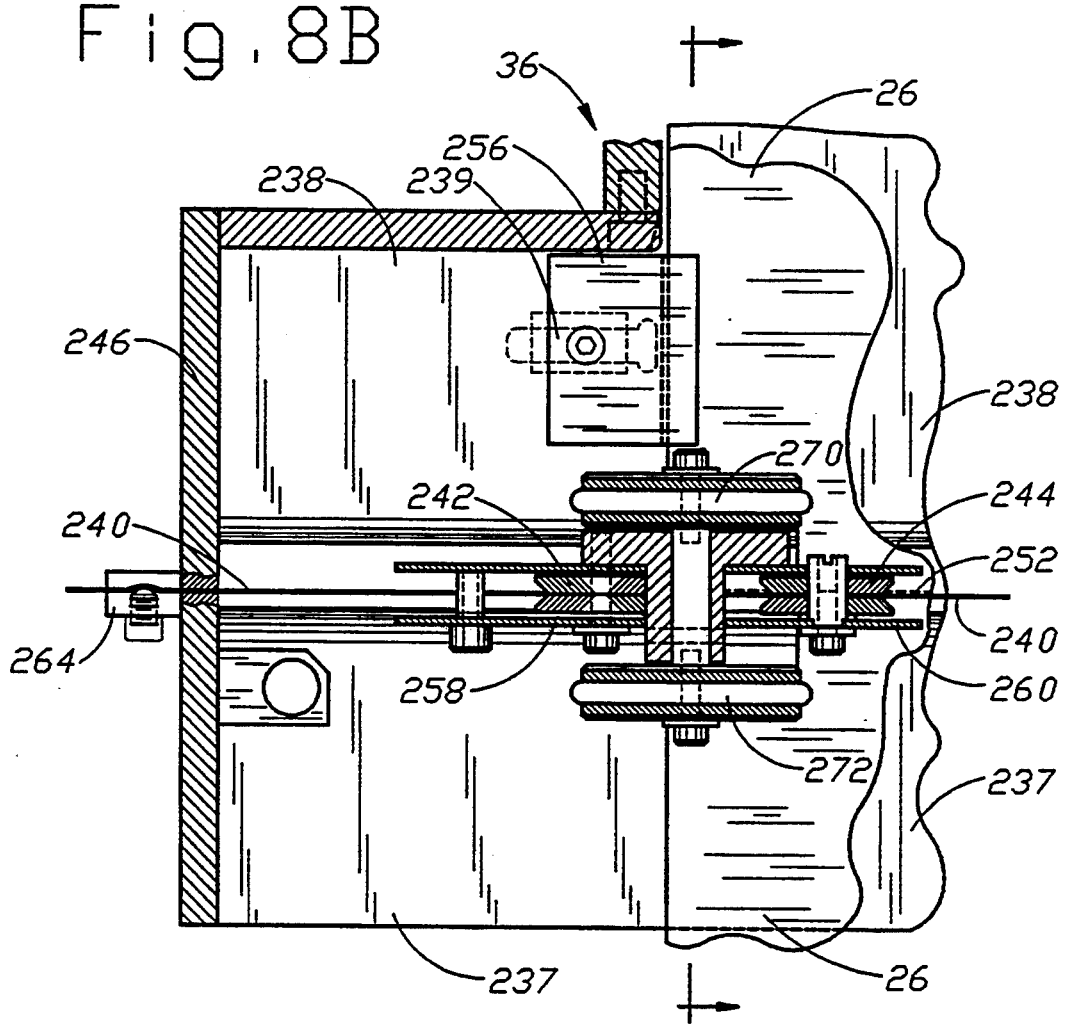

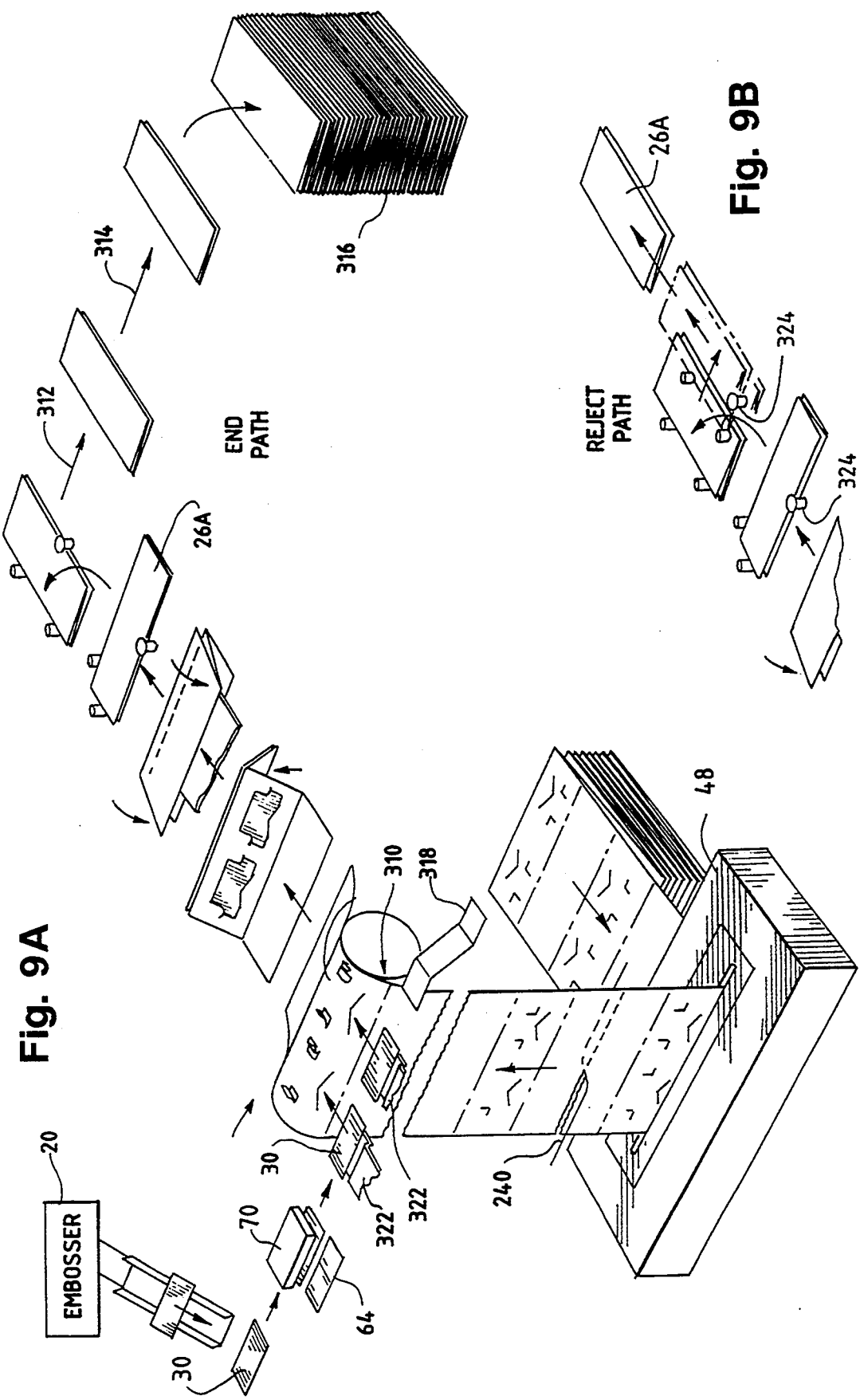

CARD PACKAGE PRODUCTION SYSTEM WITH BURSTER AND CARRIER VERIFICATION APPARATUS

This application is a continuation of application Ser. No. 08/036,159, filed Mar. 24, 1993, now abandoned which is a continuation-in-part of U.S. patent application Ser. No. 08/019,865 entitled "Automatic Embossed Card Package Production Apparatus and Methods" of Hill et al. filed Feb. 19, 1992, now abandoned.

BACKGROUND OF THE INVENTION

1. Field of the Invention

This invention relates to methods for automatically producing embossed card packages composed of embossed cards mounted to matching carrier mailing forms which, in turn, are stuffed into window envelopes for mailing.

2. Description of the related art including information disclosed under 37 CFR 1.197–1.99.

Credit card embossers of the type which create embossed, or raised, characters on plastic or metal cards, such as credit cards, debit cards, charge cards, library cards, identification cards, access cards, and the like are well known. Examples of such apparatus are show in U.S. Pat. Nos. 3,861,299 of Drillick entitled "High Speed Automatic Card Embosser" issued Jan. 21 1975; 4,088,216 of LaManna et al. entitled "Automatic Embossing System" issued May 9 1978; 4,180,338 of LaManna et al. entitled "Automatic Embossing System With Document Transfer" issued Dec. 25, 1979; 4,271,012 of LaManna et al. entitled "Automatic Embossing System" issued Jun. 2, 1981; 4,384,711 of Gabel et al. entitled "Card Feeding Apparatus For an Automatic Embossing System" issued May 24, 1983; 4,420,819 of Price et al. entitled "System For Processing and Storing Transaction Data and For Transmitting the Transaction Data to a Remote Host Computer" issued Dec. 13, 1983; 4,686,898 of LaManna et al. entitled "Credit Card Embossing System" issued Aug. 18, 1987; 4,688,785 of Nubson et al. entitled "Embossing Assembly For Automatic Embossing System" issued Aug. 25, 1987; 4,755,069 of LaManna et al. entitled "Credit Card Embossing and Recording System" issued Jul. 5, 1988; 4,784,059 of LaManna et al. entitled "Credit Card Embossing System" issued Nov. 15, 1988; 4,789,420 of LaManna et al. entitled "Credit Card Embossing System" issued Dec. 6, 1988; 4,866,545 of LaManna et al. entitled "Credit Card Embossing and Recording System" issued Sep. 12, 1989 and 4,900,168 of LaManna et al. entitled "Credit Card Transporting Embossing and Recording System" issued Feb. 13, 1990.

Likewise, it is known to automatically mount preembossed cards to carrier mailing forms, or carriers, by the inserters shown in U.S. Pat. Nos. 4,034,210 of Hill et al. entitled "Credit Card Carriers and Methods of Manufacture" issued Jul. 5, 1977; B1 4,194,685 of Hill et al. entitled "Verifying Insertion System Apparatus and Method of Operation" issued Feb. 19, 1985 and 4,429,217 entitled "Verifying Insertion System and Apparatus" issued Jan. 31, 1984.

Apparatus for automatically "stuffing" such carrier mailing forms into window envelopes and automatically applying postage are also known.

An attempt has been made to combine the functions of embossing and inserting cards into a single card package production apparatus which is illustrated in U.S. Pat. No. 4,384,196 issued May 17, 1983 to McCumber et al. While this combination embosser/inserter unit has been used successfully, it is known to suffer from certain disadvantages and full verification to make sure the card has been correctly embossed and that the carrier into which it is inserted is the mailing form with the correct name and address of the party to whom the inserted cards are issued is of the utmost importance, but yet such verification is lacking. Instead, the McCumber et al. unit relies upon rigid synchronization in the production of embossed cards and matching carriers to achieve their coming together in matching relationship. Consequently, even when an erroneous card is known to have been produced, it must still be inserted into a carrier so as not to disrupt the rigid synchronization upon which successful operation of the McCumber et al unit depends. Otherwise, it is presumed that the carrier has been correctly printed; it is assumed that if the card has been embossed, it has been embossed correctly. It is assumed that the cards and carriers have been correctly prepared and at the right time so that correctly prepared only cards are mounted to corresponding prepared carriers. Neither the carriers nor the embossments on the cards are checked for accuracy. Because the rejected cards are allowed to be inserted into carriers before rejection, produces incorrect, rejected card packages that confusingly look like correct ones are disadvantageously produced.

SUMMARY OF THE INVENTION

It is therefore the principal object of the present invention to provide an embossed card package production apparatus with a form bursting apparatus which overcomes nonverification and bursting failure problems of known systems described above.

This object is achieved in part by provision of an embossed card package production apparatus supplied with a plurality of interconnected card carrier forms for receipt of corresponding cards to form card packages with a form bursting apparatus comprising a cutting member and means for moving the cutting member along a line and through and across end ones of the plurality of interconnected card carrier forms to separate individual card carrier forms from the plurality of interconnected card carrier forms.

Preferably, the taut cutting condition maintaining means of the embossed card package production apparatus includes a pair of opposed rotary members with opposing sides between which the cutting portion wire tautly extends and about which the wire is partially wrapped. The wire has a pair of opposite fixed ends and the moving means includes means for moving the pair of rotary members along the length of the wire between the ends. This reduces excessive wear at any one location along the wire to achieve enhanced reliability.

Also, the object of the invention is obtained partially by providing an embossed card package production system having means for transporting a plurality of interconnected card carrier forms with machine readable indicia on the card carrier forms with a form bursting apparatus, comprising a carrier form bursting module with a member engageable with the carrier forms for separating the end ones of the plurality of interconnected carrier forms and means associated with the bursting module and connected with the carrier engageable member for reading the machine readable indicia on the end one of the plurality of interconnected carrier forms.

In the preferred embodiment the carrier form bursting module has a movably mounted cutting member and means for mounting it for cutting movement across the carrier form and the reading means includes a sensor for reading the machine readable indicia and means for mounting the sensor for movement with the cutting member. The sensor mounting means includes means for mounting the sensor to the cutting member mounting means to be carried therewith while the carrier is being cut. Preferably, the reading means includes means for reading the machine readable indicia in first and second opposite directions and means for comparing the indicia read in the first direction with the indicia read in the opposite direction to determine if there is a match.

The objective is also acquired by provision of a card package production system having means for accessing stored carrier information and means to print the stored carrier information onto the carrier with a carrier verification system, comprising means for reading from the carrier the carrier information printed on the carrier, means for comparing the carrier information read from the carrier with the stored carrier information to determine if there is a match and means responsive to the comparing means for automatically identifying each carrier for which the carrier information printed on the carrier does not match the stored carrier information for the carrier.

Preferably, the embossed card package production system includes means for automatically rejecting identified nonmatching carriers to prevent insertion of cards into nonmatching carriers and for preparing a new carrier to replace the rejected carrier in response to rejection of a carrier.

BRIEF DESCRIPTIONS OF THE DRAWINGS

The foregoing objects and advantageous features of the invention will be explained in greater detail and others will be made apparent from the detailed description of the preferred embodiment of the present invention which is given with reference to the several figures of the drawing, in which.

Figure 1:
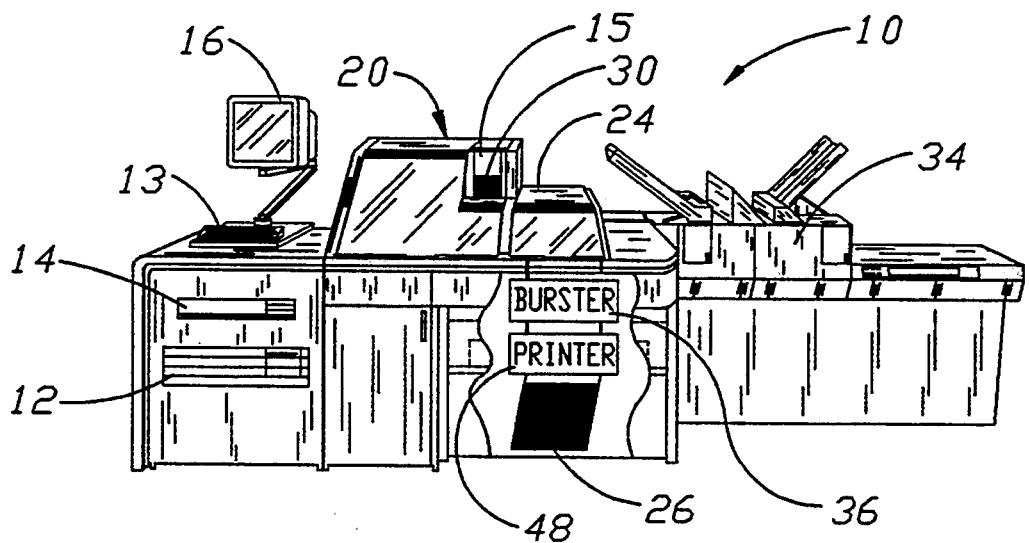
FIG. 1 is a front view of the preferred embodiment of the embossed card pack production system.
Figure 3A:
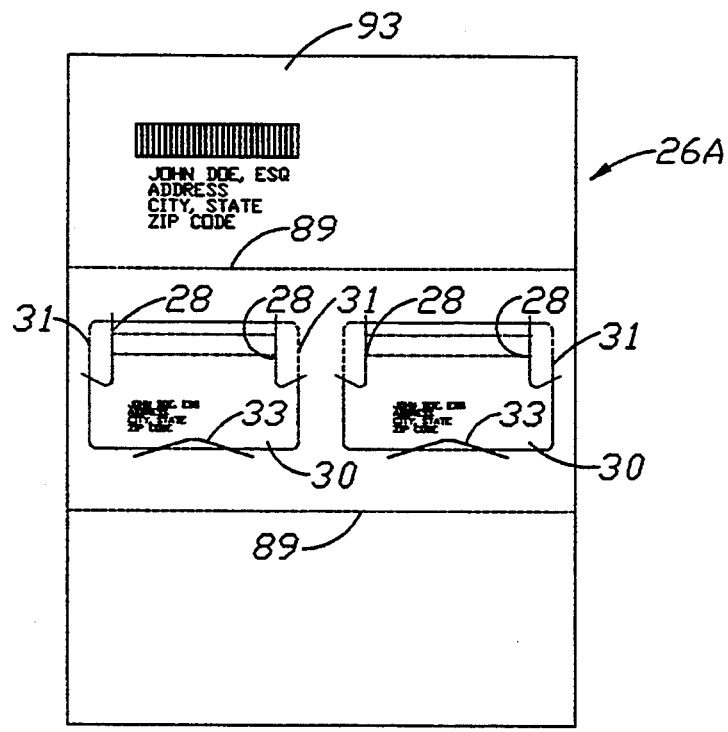
FIGS. 3A and 3B are front views of preferred embodiments of different types of card carrier forms preferably used in the preferred embodiment.
Figure 4:
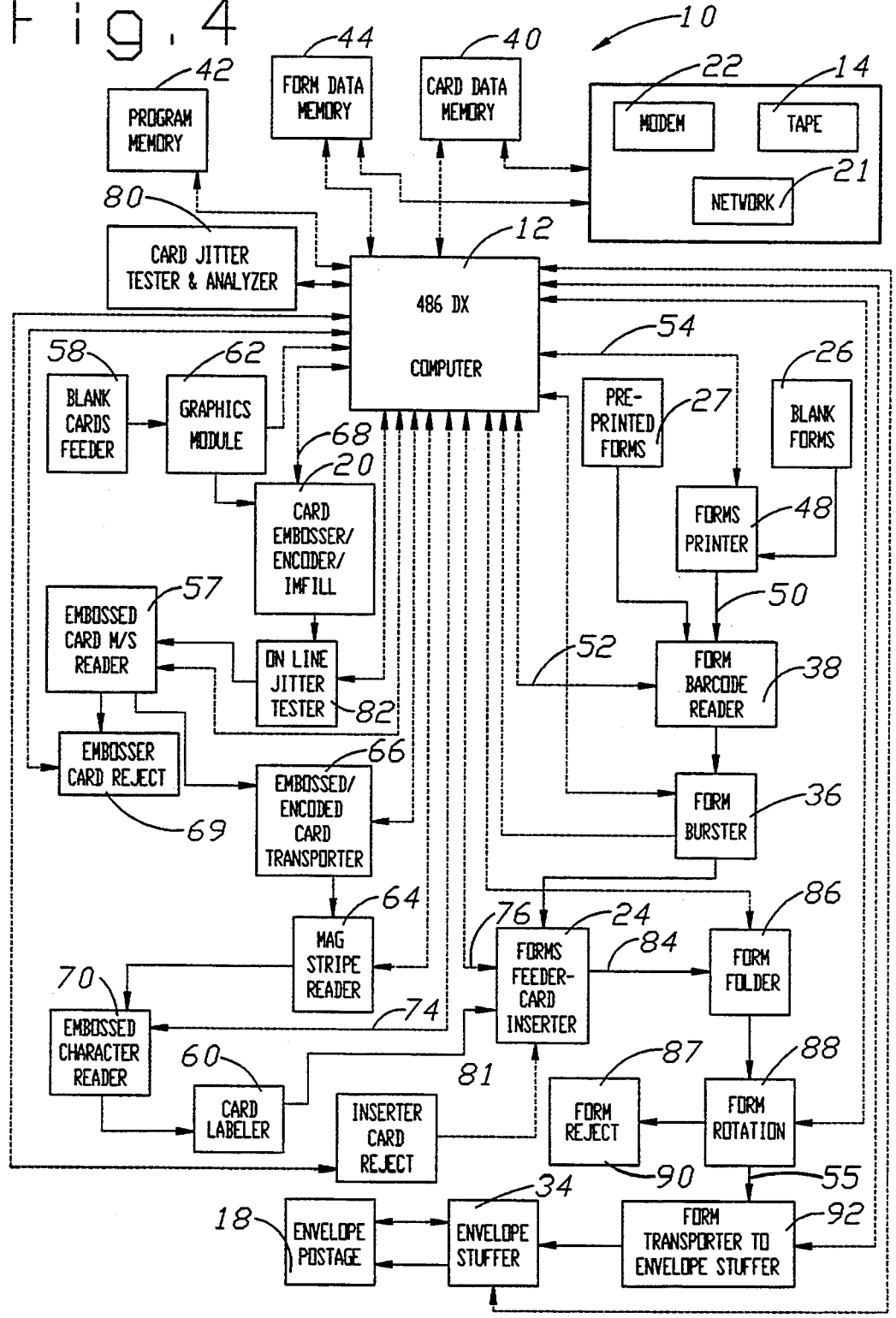
FIG. 4 is a functional block diagram of the preferred embodiment of the embossed card pack production system illustrating the preferred steps for producing an embossed card pack.
Figure 6A:
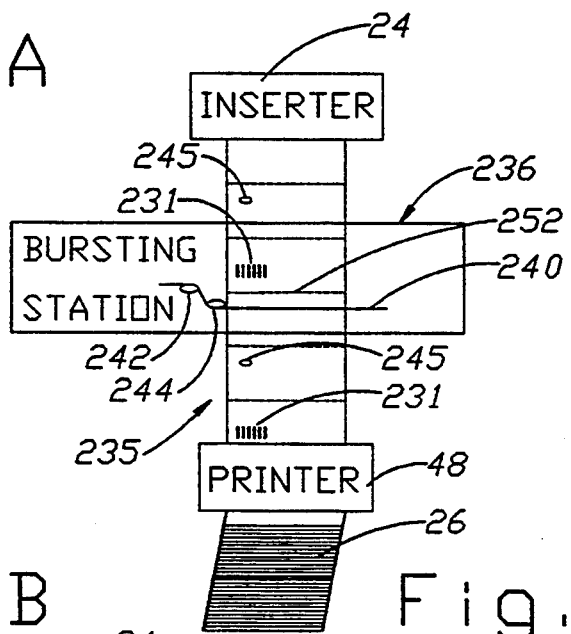
Figure 6B:
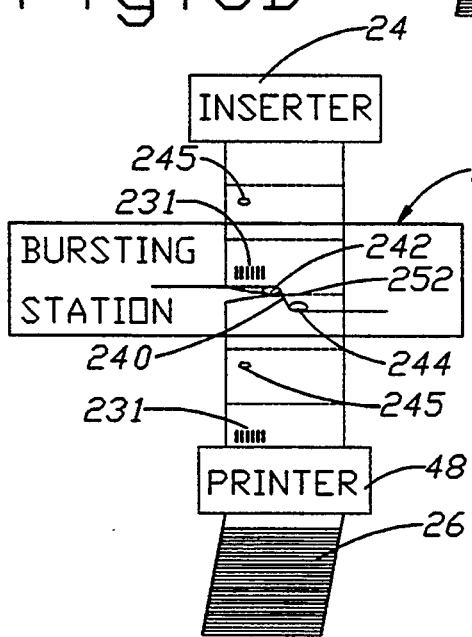
Figure 6C:
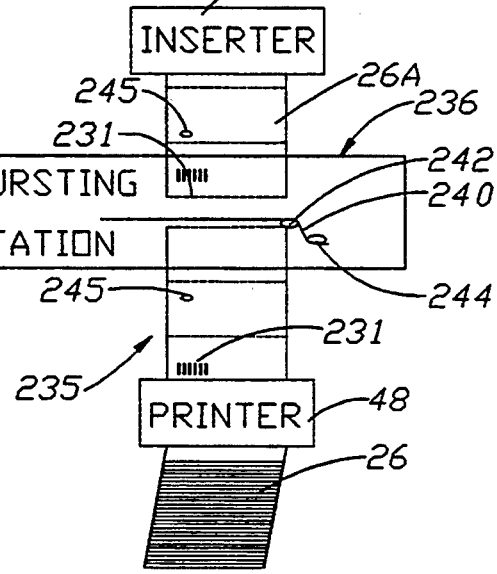
Figure 7:
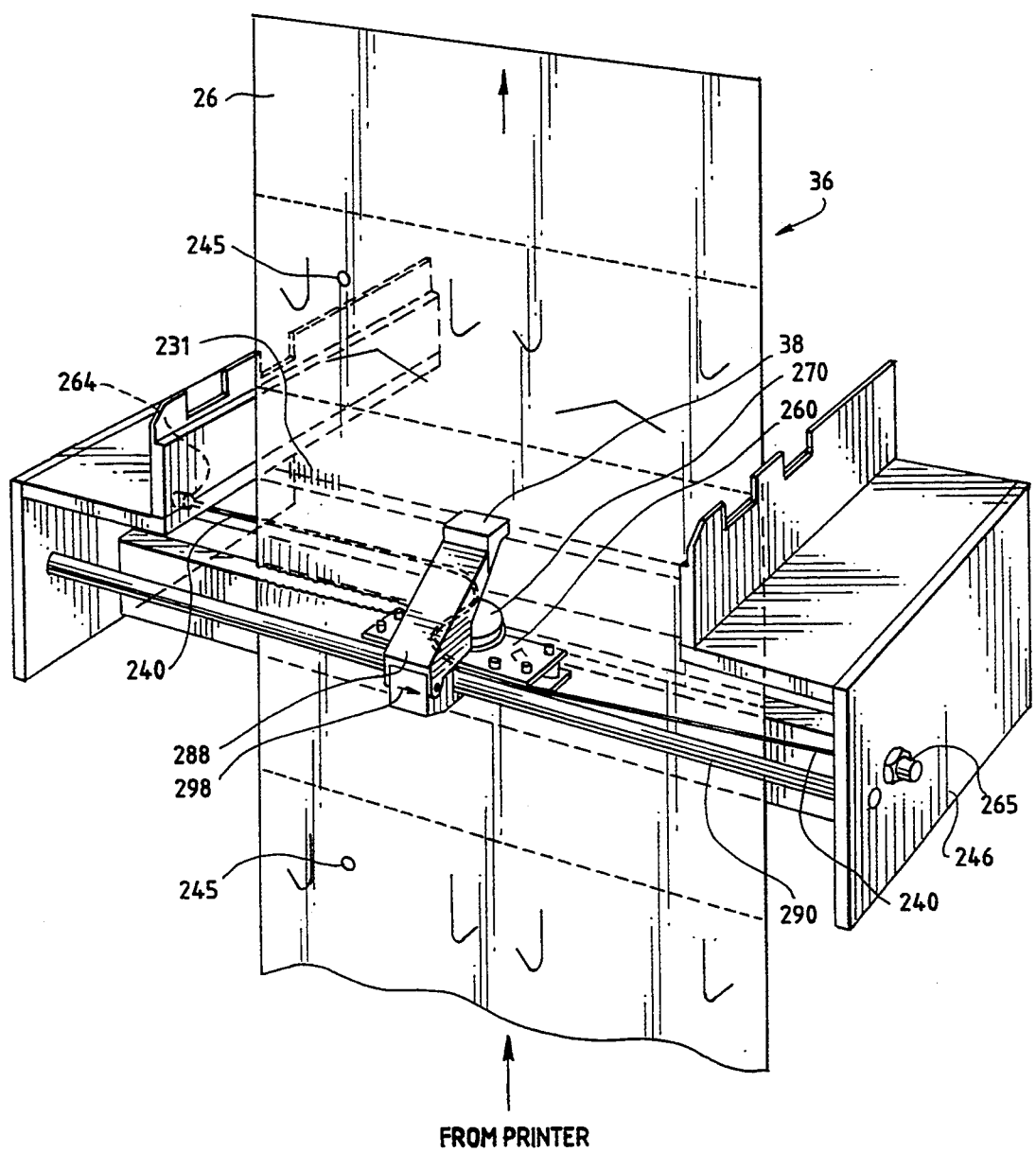
Figure 8C:
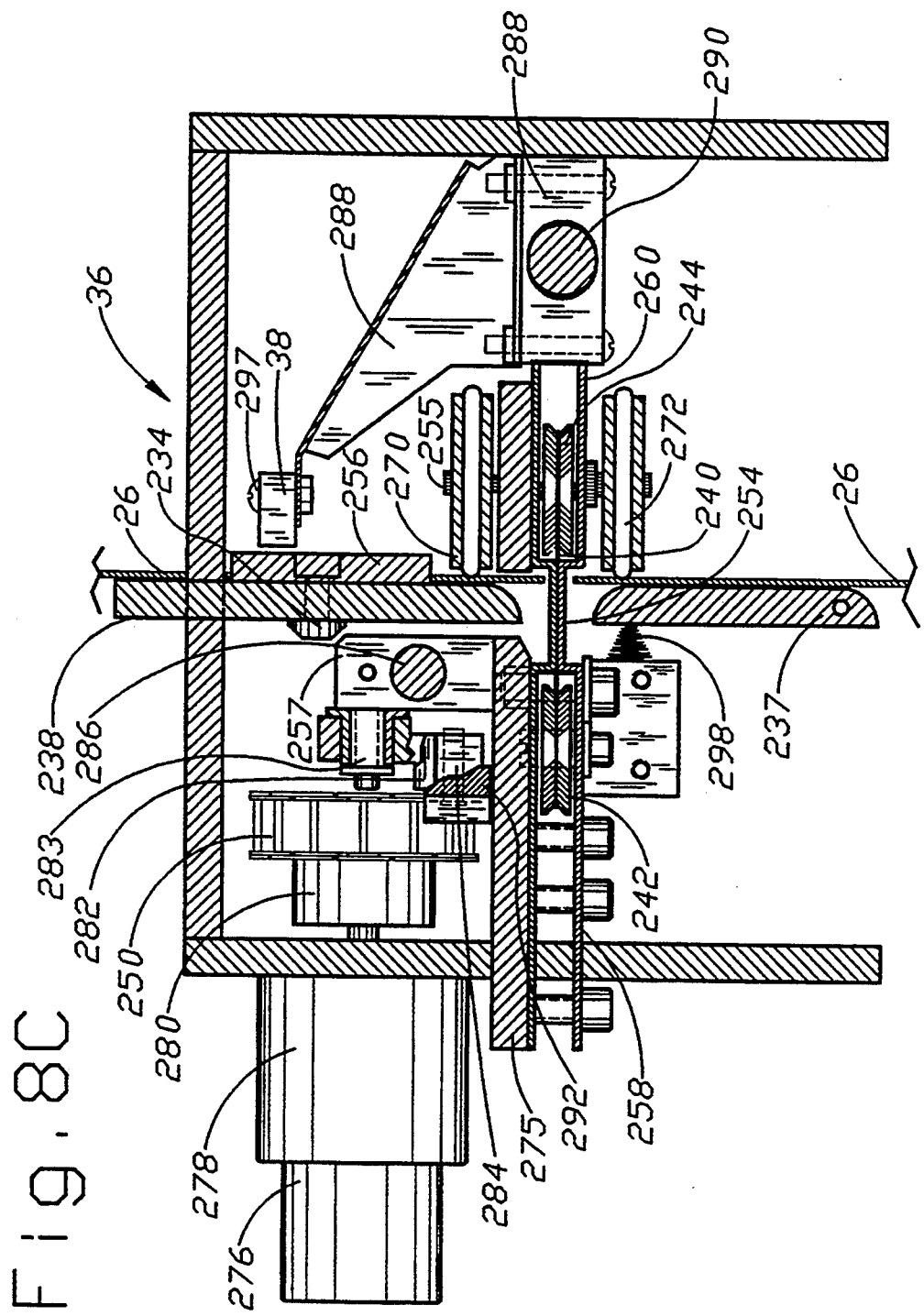

FIG. 5A, B and C are flow charts showing the procedural steps of the credit card manufacture and insertion process of FIG. 1;

FIGS. 6A, 6B and 6C is a sequence of schematic illustrations of the preferred embodiment of the burster of FIGS. 1 and 4 showing performance of the bursting operation;

FIG. 7 is a front view of the preferred embodiment of the burster shown schematically in FIGS. 6A–C;

FIGS. 8A, 8B and 8C are plant, front side and end side views of the burster of FIG. 7;

FIG. 9A is a schematic illustration of the operation of the card package production system when being used with carrier forms of the type shown in FIG. 3A; and FIG. 9B is a schematic illustration of the steps for rejecting the carrier if it is mountably prepared or does not match a card.

DESCRIPTION OF THE PREFERRED EMBODIMENT

Referring to FIG. 1, the preferred embodiment of the embossed card package production system 10 functions to produce fully verified, embossed and encoded credit cards mounted to verifiably matched carrier forms, or carriers, with the account owner's name and mailing address printed thereon and inserted into window envelopes that are metered with appropriate postage and are ready for mailing.

Figure 2:
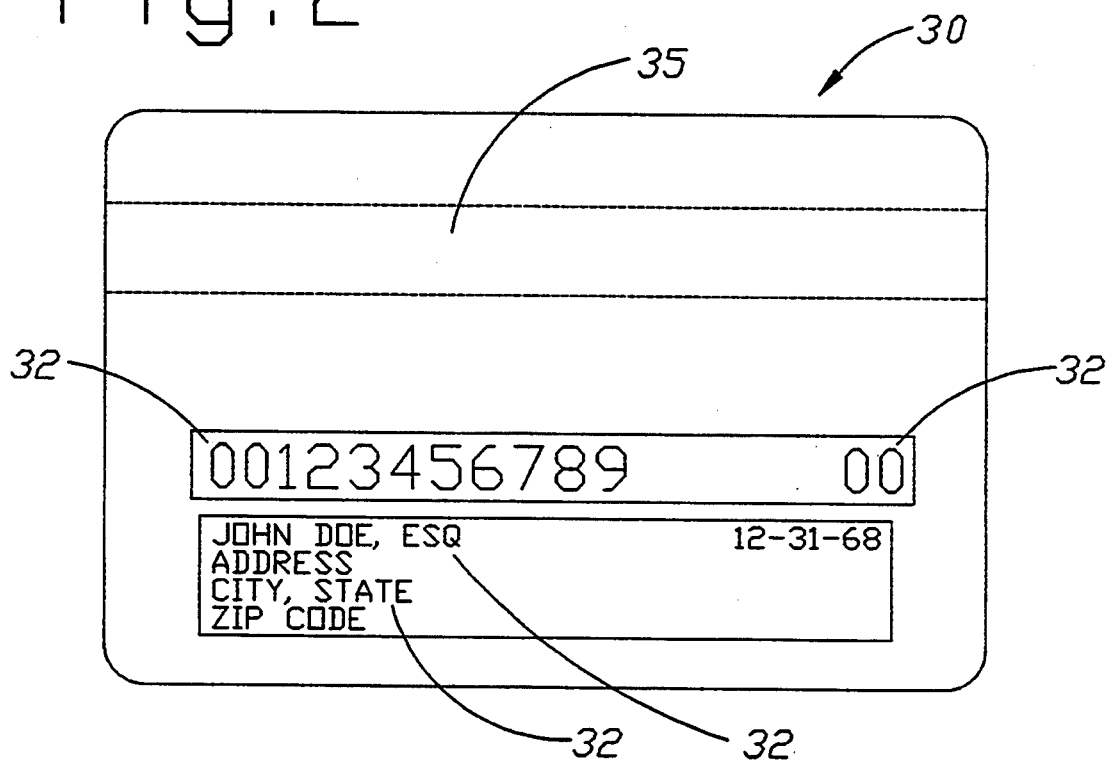
FIG. 2 is an illustration of a card having a magnetic stripe and embossed character.

The system 10 preferably includes a 486 DX computer 12 and an open reel tape drive 14 for controlling the operation of the system. A keyboard 13 is used for manual input of account data and control information into the computer 12. Information inserted into the computer 12 memory is shown at a display screen 16 of the system 10. An embosser section 20 embosses various alphanumeric characters 32 on the face of the card 30, generally the account number and name of the account owner associated with the card, and magnetically encodes like information on a magnetic stripe 35 on the back of the card 30. The embossed and encoded cards 30, FIG. 2, are carried from the embosser section 20 to a card inserter section 24. The inserter section 24 inserts correctly embossed and encoded cards 30 into verifiably matched and correctly printed carrier forms 26. The carrier forms 26 hold one or more embossed cards 30, FIG. 2, which are folded and stuffed into suitable window envelopes (not shown) at an envelope stuffer 34. The stuffed envelopes containing the carrier forms 26 with matching cards 30 are transported to a postage metering machine 18, FIG. 4 (not shown in FIG. 1), to print the appropriate mailing postage on the stuffed envelopes. The materials from which these embossed card packages are produced include blank carrier forms, or carriers, 26 and blank credit cards or like, such as shown in the U.S. patents noted above.

Figure 3B:
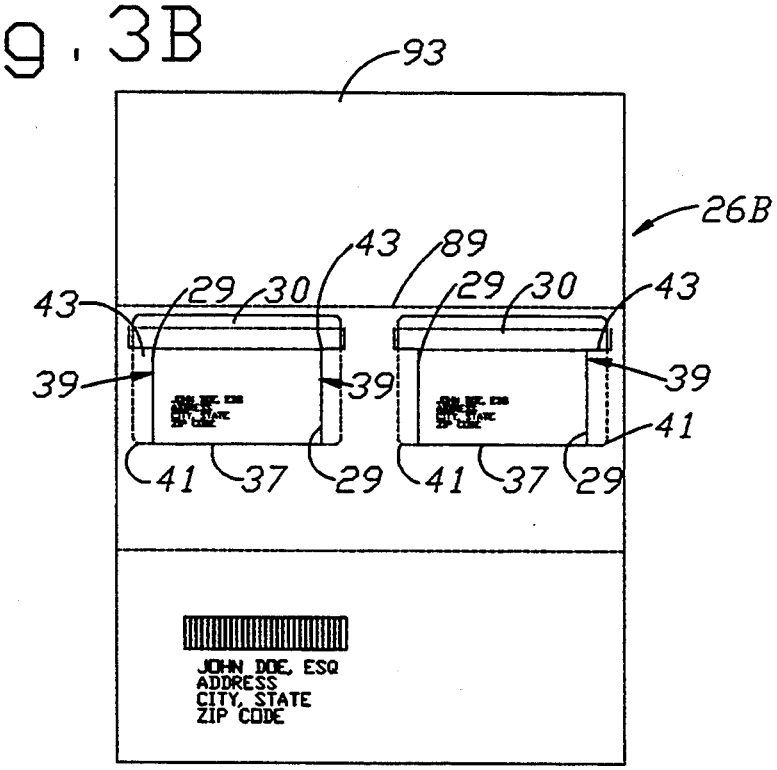

The carrier forms 26 are preferably one of those shown in FIGS. 3A and 3B and a plurality of these interconnected carrier forms 26 are fanfolded like those shown in U.S. Pat. No. 4,034,210 issued Jul. 5, 1977 to Hill et al., and as shown in FIG. 1, but are without marginal pin holes for pin drive feed mechanisms which are not employed in the ECPAP system 10. The printer 48 prints on both types of carrier forms the name and address 35 and bar code 27. The cards 30 with activation labels are mounted to the carrier by means of pockets cut into the plane paper holes 93. For further detailed information about the carrier of FIGS. 3A and 3B, reference should be made to U.S. patent application Ser. No. 08/036,436 of Hill et al. entitled "Card Carrier Forms For Automated Embossed Card Package Production System" filed Mar. 24, 1993, contemporaneously herewith. After having carrier information printed on the end one of a plurality of interconnected, fan folded carriers 26, a burster separates the end one from the others before cards 30 are inserted.

Referring to FIG. 2, the cards 30 have a field for receipt of embossed characters 32 and a magnetic stripe 35 for receipt of magnetically encoded magnetic stripe data relating to the account associated with the card. Common window envelopes which have transparent sections to enable viewing of the name and mailing address printed on the contents of the carrier mailing form are, of course, also provided as well as a full charge, or load, to the postage metering machine.

The system 10 housing contains a slide out drawer for holding the tape driver 14. The blank cards 30 are stacked in a hopper, or chute, 15 and are transported to the card embosser encoder section 20. The cards 30 are embossed with the stored card account information such as the account owner's name, address, card number and expiration date as seen in FIG. 2. The embosser section 20, FIG. 1, also magnetically encodes each card with information identifying the embossed card 30 on the magnetic stripe 35, FIG. 2, of the card. The embossed and encoded cards 30 which are correctly prepared are transported to a card labeler 60, FIG. 4, for automatic placement of removable stick-on activation labels 21 on the card 30. The adhered activation labels preferably are preprinted with a telephone number of the card issuer which the card owner calls upon receipt of the card pack through the mail to request activation of the card for use. The correctly prepared embossed cards 30 with the affixed activation labels are then passed to the card inserter 24 for placement in printed card carrier forms 26. In keeping with one aspect of the invention, labels are only applied to cards determined to be correctly prepared to avoid confusion between correctly and incorrectly prepared cards.

A fan folded stack of blank carrier forms 26 are carried through a forms printer 48 by a forms feeder in the card insertion module 24. The printer 48 prints account information such as the card account owner's name, number and address at a name and address field 35 on the blank carrier forms 26A and 26B. Additionally, one of a plurality of different bar codes 27, such as interleaved two of five code, interleaved three of nine code, Codabar UPC-A&E code, EAN-8 code and EAN-13 code are used to encode the card account information printed on the form 26 such as the account number and name.

The plurality of fan folded carrier forms 26, once printed, are sent to a form burster 36. As noted, the form burster 36 separates the end printed carrier forms 26 from the fan folded plurality of carrier forms 26 to produce individual carrier forms. In addition, in the preferred embodiment, the form burster 36 carries a sensor for reading the code 27 from each carrier form 26 as it is separated from the fan carrier forms 26. The separated carrier forms 26 are transported to the card inserter section 24 for receipt of the embossed cards 30. As many as four embossed cards are insertable into a single carrier form 26.

If the information embossed or encoded on the embossed card 30 is not correctly prepared or does not match the associated carrier form 26, the card 30 is sent to one of two reject locations 69 and 81, FIG. 4, without being mounted to a carrier 26 to avoid confusion. Likewise, carrier forms 26 which are not correctly prepared or do not match are rejected and sent to a rejected form location 90, FIG. 4, without having cards mounted to them to avoid confusion. Only correctly prepared carrier forms 26 containing correctly prepared and matching embossed cards 30 are folded and transported to the envelope stuffer 34. Only the envelopes with fully verified carriers are stuffed with the filled card carriers 26 and are transferred to a postage metering machine 18, FIG. 4, to place the appropriate postage on the envelope.

Referring now particularly to FIG. 4, card account data information is stored in a card account data memory 40, preferably a 330 Mbyte, 33 Mhz memory type for the 486 DX computer 12 made by Everex. The card account data for as many as 400,000 accounts are stored in the memory 40 with 870 bytes per account.

The account information preferably includes the name of the account, or owner of the account, the account number, the date of issuance, the date of expiration, the number of cards per account, the credit limit as well as other account information. The card account information stored in the card data memory 40 and the carrier form data stored in the form data memory 44 are selectively obtainable insertable from a number of different data input sources. A modem 22 inputs form and card data information over a telephone line from a remote computer (not shown) to the form data memory 44 and card data memory 40. Alternatively, a hardwire network 21 is used to transfer information from a plurality of computers for receipt at the system 10. Alternatively, a tape reel 14 or the like is employed for inputting card and carrier form data at the hard drive of the ECPAP system 10. This account information is organized in blocks relating to embossments, magnetic stripe encoding and carrier printing. At least some of the information of each block, such as the account number, must correspond or match some of the information of the other blocks.

Based on this account data and control information from manual inputs on the keyboard 13, FIG. 1, the system 10 produces the fully verified embossed card package comprising verified correct credit cards attached to verified correct carrier forms verified to match the attached cards within envelopes bearing postage and ready for mailing to the account owner at the name and address printed on the carrier. As noted, the verification is of the utmost importance to insure that only correctly embossed and correctly encoded cards are attached to matching carrier forms which bear the correct name and address of the account owner of the attached cards. Accordingly, one separate data verification is performed on the forms 26 while three separate data verifications are performed on the cards in addition to matching verification between the carriers and matching cards.

Referring still to FIG. 4, the operation of the 10 is under control of a microprocessor based computer 12 which communicates with the various other functional blocks as indicated by broken line connections therebetween. Card flow between the functional blocks is indicated with solid line connection while carrier flow is indicated by solid bold line connections. The microprocessor 12 is preferably a model A80486DX-3301 or equivalent microprocessor made by Intel Corporation operating at thirty-three MHz, while the program memory 42 and thus data memory is contained in a single or multiple sectored hard drive having a storage capacity of 330 MBytes and preferably comprises a model LXT340A made by Maxtor Corp. An algorithm of the program stored in the program memory 42 pursuant to which the microprocessor 12 operates to control the remaining electromechanical elements of the system 10 is illustrated in FIGS. 5A, 5B, 5C, 6 and 7 and by the listing of the preferred program for implementing the algorithm of FIG. 5A, 5B and 5C, attached hereto as Exhibit A.

Beginning with the flow of carriers 26, under control of the microprocessor 12, blank carrier forms 26 from a supply of fan folded forms 26 are then passed one at a time through a forms printer 48. A carrier form data memory 44 associated with the microprocessor 12 stores information for printing on the blank carrier forms 26. The forms printer 48 then prints on each form stored carrier form information taken from the form carrier data memory 44. This information is selected by the microprocessor 12 from the form carrier data memory 44 and relates to an associated account from the card data memory 40 including the name and mailing address of the account holder and also including other information such as the number of cards to be attached to the carrier form, the dates of issuance and expiration and the credit limit. In addition to the carrier data, the forms printer 48 under control of the microprocessor 12 also prints the bar code 27 and preselected graphics in color, if desired, and other written information, such as the terms of the agreement, which have been preselected for all or a batch of carriers stored in carrier graphics and carrier printing sections of the carrier form data memory 44. Alternatively, preprinted carrier forms 27 with the preprinted carrier account data on the forms are send directly to the form bar code reader 38 and are used for receipt of embossed cards 30 in the system 10.

The carrier account information which is unique to each carrier 26 is also preferably printed in a machine readable format such as a standard bar code 27. In keeping with one of the aspects of the invention, multiple types of bar codes are decodable by bar code reader 38 for enhanced versatility, as shown in FIG. 7. After the indicated carrier account data has been printed on a carrier 26, such as shown in FIGS. 3A and 3B, the printed carrier is passed via a path 50, to a form bar code reader 38 which photoelectronically senses the bar code associated with the printed account carrier information from each carrier 26. Obtaining one aspect of the carrier form bar code reader 38 preferably decodes the following bar codes: interleaved two of five code, interleaved three of nine code, Codabar UPC-A&E code, EAN-8 code and EAN-13 code. Code determination and decoding are performed in accordance with the algorithm shown in FIG. 7 and described below. The read carrier information is passed via a suitable two way communication path 52 to the microprocessor 12 which compares it to the stored carrier information sent to the forms printer 48 via a communication path 54 to determine if there is a match. If the carrier account information read from the carrier 26 is the same as the carrier data obtained from the form data memory 44, then there will be a match and the correct printing of the carrier 26 is verified. In that event, and if there is a match with card information on a card 30 presented for attachment to the carrier 26, the printed forms continue through the form burster 36, the forms feeder-card inserter 24, the form folder 86, the form rotation block 88 to a card package outlet 55 to a form transporter 92 to move it to the envelope stuffer 34, then to the inserter 24 where they are mated with one or more verified and matching cards.

If, on the other hand, the carrier account information read from a carrier 26 does not match the carrier information stored in the carrier form data memory 44, then achieving another objective of the invention, the carrier advantageously is sent to a carrier form rejection area 90 to prevent the incorrect form from being stuffed into an envelope. The carrier 26 passes through the form burster 24 to the forms feeder-card inserter, or inserter, 24, while the card inserter is inhibited from mounting a card. The mismatched or incorrect carrier passes through the inserter 24 without receiving a card. It then passes through the form folder 86 and at the form reject rotation unit 88 it is pushed along path 87 to the form reject location 90. While other bar code readers could be utilized, preferably the form bar code reader 38 is preferably made by Opto Technology as part number QTR while preferably the decoding is performed by a forty pin IC made by Hewlett Packard under part number HBCR-1800. Reference should be made to U.S. patent application Ser. No. 08/036,439 of Hill et al. entitled "Card Package Production System With Modular Carrier Folding Apparatus for Multiple Forms" filed Mar. 24, 1993, contemporaneously herewith, for further information relating to the preferred form of the apparatus for rejecting the incorrect carriers.

While the carrier forms 26 pass through the forms printer 48 and to the inserter 24, the cards 30 make a similar journey from a stack of cards 30 through a blank cards feeder 58, a card graphics module 62, a card embosser/encoder/infill unit 20, an on line jitter tester 82, an embossed card mag stripe reader 57, an embossed card transporter, a card mag stripe reader 64, an embossed character reader 70 and a labeler to the card inserter 24.

The blank cards feeder 58 passes blank cards one at a time to a card graphics module 62 which inputs graphic lettering and designs selectively in color on the blank card surface. The card embosser 20 is preferably of the general type shown in U.S. Pat. No. 4,969,760 issued Nov. 13, 1990 to LaManna et al., or the like. The selected card graphics and card printing information is stored in a card graphics and card printing data section of the program memory 42 and relates to information that applies to all cards or a batch of cards and is not unique to each card, as distinguished from the card account data.

The card embosser 20 embosses the card account embossed information into each card in accordance with continued inputs sent via a communication path 68 which are determined by the microprocessor 12 from the card account embossed data section of the card data memory 40. The embossed card 30 is then sent to the card magnetic stripe encoder of the embosser/encoder unit 20 which encodes the magnetic stripe 35, FIG. 2, on the card 30 with magnetic stripe card information received on the communication path 68 from the microprocessor 12 which, in turn, it obtains from a magnetic stripe card encoding data section of the card data memory 40.

An embossed card magnetic stripe reader 57 reads and decodes information encoded on the magnetic stripe 35, FIG. 2, of the card 30 and compares it with the card account embossed information sent from the card data memory and read by the embossed character reader 70, FIG. 4. In addition, the read encoded information is compared to the encoded account information stored in card data memory 40 used to encode the card. If the encoded information on the magnetic stripe 35, FIG. 3, does not match stored card account information, does not match the embossed information read from the card or the embossed information read from the card does not match the stored embossed account data, then the embossed and encoded card 30 is sent to an embosser card reject area 69. Since the card is incorrectly encoded, it is advantageously prevented from being inserted into a carrier form 26 and stuffed into an envelope to achieve one aspect of the objective of the invention. If the card is correctly encoded, based on the reading by the embosser card M/S reader, the embossed and encoded cards 30 are then moved via the embossed-/encoded card transporter 66 to the card magnetic stripe, or M/S reader 64, and the card embossed character reader 70 which respectively receives what is read by each via paths 72 and 74 and makes comparison to account data stored in the card data memory for each and also compares what is read by each to each other. The embossed character reader 70 is preferably of the type shown in U.S. Pat. No. B1 4,194,685 of Hill et al. entitled "Verifying Insertion System Apparatus and Method of Operation" issued Mar. 25, 1980, reissue certificate issued Feb. 19, 1985.

While other devices could be used successfully, preferably the embossed character reader 70 is made by Dynetics Engineering Corporation and is shown in U.S. Pat. No. 4,215,813, while the magnetic stripe reader 64 is preferably made by Brush Industries under part number 901-529-0.

Coupled with the 486 DX computer 12 is a manually operated card jitter tester and analyzer 80 quality check tool built by Q-Card Corp. of Owings Mills, Maryland. A card is manually run through the jitter tester 80 and the computer 12 analyzes the encoding at seventy-five bits per inch of the card for track one and two hundred ten bits per inch for tracks two and three. The card jitter tester and analyzer 80 graphically displays a JT1A report on the display screen 16, FIG. 1, or on a print out indicating if the tested card has been properly encoded. Alternatively, an on line jitter tester 82 is placed for receipt of cards exiting the card embosser/encoder 20. Prior to carrying the embossed and encoded cards 30 to the card labeler 60 by the transporter 66, the on line card jitter tester and analyzer 82 reads the cards to verify proper encoding. Preferably, the jitter tester and analyzer 80 is like one made by Q-Card Company of Owing Mills, Maryland and the on line jitter tester 82 is the same as jitter tester 80 but with a computer interface and automatic card transporter provided.

The microprocessor 12 compares each reading of the embossed information on the card 30 by the photoptical embossed character reader 70 and the magnetic stripe reader 64 to the account data information stored in the appropriate section of the data memory 40 and to each other. Advantageously, the information decoded from the magnetic stripe 35, FIG. 2, of the card 30 by the magnetic stripe reader 64 is compared with the embossed card character information read by the embossed character reader 70 to determine if there is a match. If there is a match of information, the card 30 is internally verified to be correct, and is passed to the inserter 24. If the coded information from the magnetic stripe reader 64 does not match the embossed character information on the card read by the embossed character reader 70 do not match each other, then the microprocessor 12 identifies the card as being incorrectly embossed or encoded and the card is rejected before insertion into a carrier.

After checking the embossed cards 30 for correctness and automatically rejecting the identified incorrect cards, the card transporter 66, under the control of the microprocessor 12, enables the card labeler 60 to label only those. The card labeler 60 automatically applies removable informational labels, such as stick-on card activation labels 21, FIGS. 3A and 3B, to only the correct cards 30. The computer 12 through means of card labeler 60 or, alternatively, the card labeler itself, accumulates information concerning the total number of informational labels applied to the cards 30 and the total number of correct cards. The passing of the correct cards 30 to the labeler is selectively performed either manually or automatically in a single card production apparatus 10, while the labeling is produced only automatically and only on verified correct cards. In this way, correct cards with labels are readily distinguished from rejected cards without labels.

The inserter 24, under control of reports from the microprocessor 12 via a communication path 76 causes the internally verified card 30 to be mounted to a matching carrier 26. Advantageously, the microprocessor via communication path 52 compares the coded carrier information read from the form bar code reader 38 with the coded card information read from the magnetic stripe reader 64 and the embossed information read by the embossed character reader 70 to determine if there is a match and thereby eliminates the need for synchronization between card and carrier production to achieve a match without verification. Advantageously, the card inserter 24 rejects the cards 30 which do not match the carrier information decoded from the carrier 26 before insertion into a carrier. The nonmatching cards are sent to an inserter card reject area 81 and the empty carrier 26 is separately sent to a carrier form reject area 90. Cards 30 having information which does not match the carrier information or the stored account information are prevented from being inserted into the corresponding carrier at the card inserter 24. The embossed cards 30 which have card information that do match the decoded carrier information are mounted to the matching carrier 26 at the card inserter 24.

One or more cards 30 are selectively insertable into a single matching carrier form 26. The automatic card mounting apparatus or card inserter 24 is located at an insertion station at which cards 30 are mounted to carrier forms 26 including those shown in FIGS. 3A and 3B. The embossed card package production system 10 routes cards 30 to a plurality of different carrier mailing forms 26. Referring to FIGS. 3A and 3B two types of carrier forms 26A and 26B employed in the system 10, FIG. 1, are shown holding embossed cards 30. The first type of form 26A, FIG. 3A, is flexible planar body 93 having a pair of spaced parallel ear shaped slots, or corner pockets, 28 for receipt of the sides 31 of a card 30 and one of either the top or the bottom of the card. The form 26A has a bottom flap, or lip, 33 for receipt of the other of the top or bottom or the card 30. The corner pockets 28 and the lip 33 are cut from the flexible planar body 93. The card 30 is held between the pockets 28 and the lip 33 at a location spaced from the periphery of the body 93. The corner pockets 28 hold the card 30 against movement in three of four possible rectilinear directions. The lip 33 engages with an edge of the card 30 and is intermediate to the corners of the card to hold the card 30 against movement in the fourth possible rectilinear direction.

A second type of carrier form 26B seen in FIG. 3B has a flexible planar body 93 with a pair of parallel spaced side slot sections 29 and a fold 89 to hold the card 30 within the side slots. The mailing form 26B has a pair of rectilinear slots 39 cut in the body 93 to form a pair of opposed corner pockets for receipt of opposed corners 41 of the card 30. The rectilinear slots 39 have a pair of parallel spaced slot sections 29 and a cross slot section 43 transversely extending between the pair of parallel spaced slot sections 29. In the form of FIG. 3A, the corner pockets open away from the leading end section and the address and toward the bar code field 27 while in the carrier of FIG. 3B, the address is located on the lagging end section while the pockets face toward the bar coding and away from the leading edge. Reference should be made to U.S. patent application Ser. No. 08/036,436 of Hill et al. entitled "Card Carrier Forms For Automated Embossed Card Package Production System" filed Mar. 24, 1993, contemporaneously herewith, for further details about each of these different types of carriers.

In the system 10 a card feeder or transporter 66 feeds cards 30 to the insertion station at which a card inserter 24 is located. The card inserter module 24 includes a forms feeder adapted to feed the different types of mailing carrier forms 26A and 26B from the fan of folded carriers to an insertion station. A first type of card insertion apparatus 24 is releasably mounted at the insertion station to insert cards 30 into one type of form carrier 26A. The card inserter 24 automatically mounts embossed cards 30 to the first type of carrier forms 26A. To insert cards 30 into a different or second type of carrier 26B in the ECPAP system 10, the first type of inserter is removed from the insertion station and mounted in its place is a second type of card insertion apparatus for inserting cards into the second type of carrier form 26B. The embossed cards 30 are automatically mounted to the second type of carrier mailing form 26B by using the second type of insertion apparatus. The preferred form of the different insertion apparatus for the different carrier forms are shown in U.S. patent application Ser. No. 08/636,664 of Hill et al. entitled "Embossed Card Package Production System With Modular Inserters For Multiple Forms and Card Verification Apparatus" filed Mar. 24, 1993, contemporaneously herewith.

After all the cards 30 have been attached to a matching carrier form 26, the inserter 24 passes the filled carrier form via path 84 to a form folder 86. The form folder 86 folds the loaded carrier 26 along two perforation lines 89, FIG. 3, to divide the carrier into three equal areas. As with the inserters, two different types of folders are alternatively employed for folding different types of carriers. The folded carrier forms 26 are rotated by an arm at a form rotation station 88 for insertion into mailing envelopes. Before being rotated, the form of FIG. 3A is flipped over after folding while the form of FIG. 3B does not and therefore different folders are used when there are different carrier forms. Empty carrier forms 26 which do not match with a corresponding card or are otherwise improperly prepared are sent via a transportation path 87 to a form reject area 90 to avoid placement into mailing envelopes. The preferred embodiment of the form folder 86, form rotation unit 88, form reject unit 90 and form transporter to envelope stuffer 92 are shown in U.S. patent application Ser. No. 08/036,439 Hill et al. entitled "Card Package Production System With Modular Carrier Folding Apparatus For Multiple Forms" filed Mar. 24, 1993, contemporaneously herewith, and reference should be made thereto for details of how the different carriers of FIGS. 3A and 3B are folded different to point them both to the envelope stuffer in the correct orientation.

Folded carriers 26 with correctly matched embossed cards 30 are carried along a form transporter 92 to the envelope stuffer 34. The envelope stuffer 18 preferably used is a Pitney Bowes Spectrum Model F400. The envelope stuffer 34 places the filled and folded carrier form 26 into a window envelope from a supply of window envelopes. The stuffed envelopes are then sealed and passed to a postage metering machine (not shown) which applies correct postage to the envelope. The postage metering machine used is preferably one made by Pitney Bowes such as Paragon Mail Processor Model Nos. USS4–USS9, Eagle Model E660 or E670, or a Model 5300 or 5636.

Referring now to FIG. 5A, the computer 12 retrieves customer account information in step 100 including the name of the customer, the account number, the date of issuance, the date of expiration as well as other information. In step 102 the account information is transferred to the embosser while in step 108 the form printer receives the customer mailing information. In step 104 the blank card is embossed and the magnetic stripe encoded with the account information while in step 110 the form is printed with the customer mailing information.

In step 106 the card is read back and verified with the computer file while in step 112 the form is separated from the stock and read at the bursting station. In step 114 the computer file, the embossed card information read from the card, the encoded information read from the card, and the printed information read from the carrier form are all compared together to determine if there is a match. In step 116 a determination is made as to whether all the information is correct.

Referring now also to FIG. 5B, if all the information is not correct, the error is processed in step 118. In step 120 the counter verifies if the embossing and encoding are correct. If an error is detected, in step 122 the counter will cause rejection of the card and will then in step 124 cause a new card to be embossed and encoded. In step 126, after the new card is prepared, the counter returns to step 114 to compare the new card to determine if the new card has been properly prepared.

If in step 121 the card is verified to be prepared correctly, in step 128 the form will reread and in step 130 a comparison will be made to verify if the form and computer file match. If the form matches the file, the form and card are then processed in step 120 detailed in FIG. 5C.

If the form is correct, the form is ejected in step 132, a new form is printed in step 134, and the new form is read in step 136. In step 138 the new form is compared to the data file. If the file matches the form, a decision is made to process the card and form. If a discrepancy still occurs, the microprocessor based computer will stop the operation in step 140 and operator intervention is required.

Referring now to FIG. 5C, if the embossed encoded card, the printed carrier form and the information in the computer file match and a decision has been made to process in step 120, in step 142 the computer 12 causes the cards to be inserted into the carrier form and then in step 144 fold the carrier forms are folded closed for insertion into envelopes. The forms are then turned ninety degrees in step 146 so that the forms are in proper alignment for insertion into an envelope by an envelope stuffer.

In step 148 the computer 12 checks if the envelope stuffer is ready for receipt of a form. If not ready, the computer 12 pauses in step 156 to allow the operator readies the stuffer in step 158. After it is determined in step 148 that the envelope stuffer is ready, the stuffed carrier forms are sent to the envelope stuffer in step 150.

The microprocessor based computer 12 selects the next customer account record in step 152 and returns to the start process 100, FIG. 5A, in step 154.

Referring to FIG. 6A, an interconnected fan of carrier forms is shown being fed in the direction indicated by arrow 235 from a printer 48 to a bursting station 236. The card carrier forms 26 have machine readable indicia 231 printed on the surface of the form to identify information such as the name, address, and account number printed on the carrier form. The printed carrier form is fed from the bursting station 236 to an inserter 24 which places corresponding cards 30 into matching carrier forms 26. Before the carrier forms 20 are fed to inserter 24, they pass through the bursting station 236 where a form bursting apparatus 36 separates the interconnected card carrier forms 26 into individual carrier forms 26A, FIG. 6C. The form bursting apparatus at the bursting station 236 has a cutting member 240 partially wrapped about a pair of opposed rotary members 242 and 244 which carry the cutting member diagonally between the rotary members. Preweakened lines 252 mark the division between the individual carrier forms in the interconnected fan of carrier forms 26. In FIG. 6A, the cutting member 240 is shown in the home position with the preweakened lines 252 aligned between the carriers 26. Each of the carrier forms 26 have a sensing hole 245 which is read by an optical hole sensor 249, FIG. 8, to signal the alignment of the preweakened lines 252 with the cutting member 240.

In FIG. 6B, the cutting member 240 laterally moves across the preweakened lines 252 to separate the interconnected carrier forms 26 into individual carrier form sheets 26A. Rotary member 242 is placed on one side of the carrier form 26 and rotary member 244 is placed on the other side of the carrier form. As the rotary members 242 and 244 move across the preweakened lines 252 of the carrier form, different portions of the cutting member 240 are wound through the rotary members as the cutting member slices through the carrier form. In FIG. 6C, the cutting member 240 is in a distal position having completed a cutting cycle separating an individual carrier form 26A from the interconnected fan of carrier form 26.

Referring to FIG. 7, the form bursting apparatus 36 is shown moving the cutting member 240 laterally across the preweakened lines 252 of the interconnected carrier forms 26. The cutting member 240 is fixed by wire tension screws 264 and 265 to opposing sides of the burster mechanism housing 246. An elongate slide bar 290 extends between the housing walls 246 and carries a sliding member 288 which moves across the bar in the direction of arrow 298 when bursting the interconnected carrier forms 26. Mounted to sliding member 288 is an optical bar code reader 38 which reads the machine readable indicia 231 as the cutting member 240 is moved through the carrier forms 26. The reader 38 also reads the coded indicia 231 when the cutting member 240 is returned to the home position after separating the carriers 26 as a backup in case an accurate reading was not accomplished during the bursting of the carriers along the perforation lines 252.

Referring to FIG. 8A, the a cutting member 240 is fixed at opposing housing walls 246 of the form bursting apparatus 36. Movement of the cutting member 240 is powered by an electric drive motor 248 which is interconnected with a chain drive 250 to slide the rotary members 242 and 244 with the cutting member 240 through and across the ends of the interconnected carrier forms 26 to create individual card carrier forms. The printer 48 under the control of the computer 12, FIG. 1, incrementally moves the plurality of carrier forms 26 one at a time to the bursting station 236, FIG. 6A. The cutting member 240, FIG. 7A, moves laterally across the carrier forms 26 to cut and separate an individual form from the interconnected fan of carrier forms.

As seen in FIG. 8B the preweakened lines 252 laterally extending across the carrier forms 26 facilitate easy separation of individual forms by the cutting member 240. The preweakened lines 252 mark the division between the individual carrier forms in the interconnected fan of carrier forms 26. The interconnected carrier forms 26 are successively moved by the printer 48, FIG. 6A, to the busting station 236 such that the preweakened lines 252 are aligned with the cutting member 240. An interconnected carrier form 26 is moved from the printer 48 through the bursting apparatus 36 until the sensing hole 245, FIG. 6A, on the carrier form is ready by light responsive optical sensor 249, FIG. 8A. The sensor 249 coupled with the microprocessor based computer 12, FIG. 1, signals the computer to terminate the feeding of the carrier form through the burster 36 in response to light being passed through sensor hole 245, FIG. 6A and being sensed by the optical sensor. The reading of light by sensor 249, FIG. 8A, through the sensor hole 245, FIG. 6A, of the carrier 36 acknowledges that the preweakened lines 252 are aligned with the cutting member 240. The sensor 244 is mounted above the cutting member 240 such that when the carrier is stopped from being fed to the burster 36 in response to light being sensed through hole 245, the preweakened lines 252 are aligned with the cutting member. In response to the carrier hole optical sensor 249, FIG. 8A, performing this reading, the motor 248 is activated to move the cutting member 240 across the preweakened lines 252, FIG. 8B, to separate the individual carrier form sheets 26 from the interconnected fan of carrier forms. A carrier form guide plate 256, FIG. 8B, is mounted to a fixed upper backing plate 238 by screw 239 to guide the card carrier forms as they are fed from the printer 48 through the form bursting apparatus 36.

Referring again to FIG. 8A, the cutting member 240 is a wire disposed between the pair of rotary members 242 and 244. The wire 240 is carried through rotary members 242 and 244 as the electric motor 248 moves the chain drive 250 across the length of the form bursting apparatus 36. Different parts of the wire are moved across the interconnected card carrier forms 26 as the wire 240 moves through the rotary members 242 and 244 and slices across the carrier forms. The prior of rotary members 242 and 244 are moved along the length of the wire cutting member 240 between ends 262 and 263 while both rotary members remain engaged with the wire to maintain the different parts of the wire in the taut condition. The form bursting apparatus 36 has another cutting member 254 mounted in tandem relationship with the wire cutting member 240. The other cutting member 254 moves through the interconnected carrier forms 26 to provide backup cutting action in the event of failure of the wire cutting member 240. The other cutting member 254 is a blade mounted between support plates 258 and 260 in cutting relationship with the interconnected carrier forms 26.

The opposed ends 262 and 263 of the cutting wire 240 are fixed by means of thread screws 264 and 265 to the burster housing 246. The wire is partially wrapped about opposed sides 266 and 268 of the opposed rotary members 242 and 244, respectively. The cutting portion of the wire 240 tautly extends between the opposite sides 266 and 268 of the opposed rotary members 242 and 244 to maintain a taut cutting condition in the wire. The pair of rotary members 242 and 244 move along the length of the wire 240 between the fixed wire ends 262 and 263. Wire end 26 is attached to the fixed tension screw 264 and the opposed wire end 263 is attached to an adjustable threaded tension screw 265. The tension in the wire is adjusted by turning a knob 269 on the adjustable threaded tension screw 265 in one direction. The wire 240 pulled through the adjustable thread screw 265 at end 263 in conjunction with end 262 being fixed by the fixed thread screw 264 increases the tension in the cutting member 240. The knob 269 is turned in the other direction to lower the tension created in the cutting member.

As seen in FIG. 8C, a pair of rollers 270 and 272 are mounted to support plate 260 through shaft 255. Roller 270 is slidably mounted to ride along the length of fixed backing plate 238. Roller 272 is slidably mounted to ride along the length of movable backing plate 237. Movable backing plate 237 is a spring loaded plate connected with spring 298 to provide uniform tension along the carrier 26 so as to not bind the carrier. As seen in FIG. 8B, when in the cutting position, roller 270 is mounted slightly above the preweakened lines 252 of the interconnected carrier forms 26 and roller 272 is mounted slightly below the preweakened lines. The rollers 270 and 272 pinch the carrier form 26 against backing plates 237 and 238 on each side of the preweakened lines 252 to stabilize the forms as the cutting member 240 moves laterally across the preweakened lines. The rollers 270 and 272 are carried in front of the cutting member 240 by approximately one eighth of an inch as they move across the interconnected carrier forms 26. The stabilization by the rollers 270 and 272 limits the slack in the carrier form sheets 26 to enable a clean separation of the forms by the cutting member 240.

Referring again to FIG. 8A, movement of the cutting member 240 across the card carrier forms 26 is accomplished by the electric motor 248. The electric drive motor 248 mounted adjacent the burster housing 246 is connected with a hub 274 of a sprocket which interconnects the drive chain linkage 250 extending across a length of the bursting apparatus 36. An electrical brake 276 connected with a standoff 278 is mounted adjacent the housing 246 of the form bursting apparatus 36 and is interconnected with another hub 280 of another sprocket connected to the drive chain linkage 250. The electrical brake 276 and the drive motor 248 are coupled with and controlled by the microprocessor based 486 DX computer 12 of the embossed card package production apparatus 10, FIG. 1. The brake 276, FIG. 8A, stops the cutting member 240 from moving after it has laterally cut across the interconnected carrier form and has returned to the home position. A home position sensor 292 coupled with the microprocessor based computer 12, FIG. 1, actuates the brake 276, FIG. 8A, to stop movement of the chain linkage 250 in response to the cutting member 240 being in the home position. The home position sensor 292 is mounted to optically read top plate 275 connected to support plate 258, FIG. 8C, indicating that the rotary members 242 and 244 are in the home position. The brake 276 stops the movement of the cutting member 240 and the separated end carrier form 26A, FIG. 6A, is transported to the inserter 48. The next carrier form 26 is fed from the printer 48 through the form bursting apparatus 36 until the other optical sensor 249, FIG. 8A, reads the sensing hole 245, FIGS. 6A–6C, on the carrier activating the motor 248, FIG. 8A, to move the cutting member 240.

The chain linkage 250, FIG. 8A, is interconnected with an arm 282 by pin member 284. The elongate arm 284 is interconnected with another pin member 273 attached to sliding member 257. Sliding member 257 is supported by an elongate support member 286 and is interconnected with support plate 258, FIG. 8C, through top plate 275. Support plate 258 is attached to rotary member 242. The backup cutting blade 254 extends between support plate 258 and another support plate 260 which carries rotary member 244. The cutting wire 240 extends between the rotary member 242 of support plate 258 and the other rotary member 244 connected to support plate 260. The other support plate 260 is mounted to sliding member 288, FIG. 8C, which is supported by another elongate bar 290 substantially spaced parallel from the elongate bar 286 connected with sliding member 257 and support plate 258. As the drive motor 248, FIG. 8A, moves the chain link 250, the arm 284 slidably moves the one support plate 258 and, in turn, the other support plate 258 connected with sliding members 257 and 288 along the elongate parallel spaced bars 286 and 290 supporting the cutting member 240.

The cutting member 240 is moved along the form bursting apparatus 36 from a home position prior to cutting a carrier form 26 to a distal position after cutting of a carrier form during a cutting cycle. The drive motor 248 returns the cutting member 240 back to the home position upon completion of the cutting member separating end carrier forms 26A, FIG. 6A, from the interconnected card carrier forms 26. As seen in FIG. 8A, the home sensor 292 connected by a standoff 293 to the bursting apparatus housing 246 senses the top plate 275 when the cutting member 240 has returned to the home position by reading.

The interconnected card carrier forms 26 transported by the form printer 48 to the form bursting apparatus 36 have machine readable indicia 231, FIG. 6A, on the body of the card carrier forms. As seen in FIG. 8C, the carrier form bursting module 36 contains a code reader or sensor 38 for reading the machine readable indicia 231, FIG. 6A–6C, on the end ones 26A of the interconnected card carrier forms 26 as the end carrier form 26A is separated from the interconnected carrier forms by the cutting member 240. The reader 38 is connected to the sliding plate member 288 by screw 297. The sliding plate member 288 is slidably mounted to the elongate support member 290. As the electric motor 248 drives the chain link 250 to move the cutting member 240 across the card carrier form 26, the reader 38 reads the machine readable indicia 231, FIGS. 6A–6C. The reader or sensor 38 is mounted to elongate support member 290 to read the bar code 231 while the carrier 26 is being cut. The sensor 38 is mounted along the elongate support member 290 to move back and forth across the carrier 26 as the cutting member 240 moves through a cutting cycle.

The machine readable indicia 231, FIG. 6A, is also read in the opposite direction upon the motor 250, FIG. 8A, returning the cutting member 240 to the home position. The machine readable indicia 231 is read upon return to the home position as a backup in case of a poor reading during the separation of the carriers 26. The microprocessor based computer 12, FIG. 4, coupled with the bar code sensor 38 compares the machine readable indicia 231, FIG. 6A, read in one direction with the indicia read in the opposite direction to determine if there is a match. The computer 12 also compares the carrier information read by the sensor 38, FIG. 8C, from the machine readable indicia 231 with stored carrier information located in a memory of the computer 12 to determine if there is a match. The computer 12 automatically identifies each carrier 26 for which the carrier information printed on the carrier as machine readable indicia that does not match the stored carrier information in the memory. If the information on the carrier card read by the sensor 38, FIG. 7, does not match the stored carrier information, then the carrier has not been properly printed. If there is no match, the computer 12, FIG. 1, directs a transporting pin 324, as seen in FIG. 9B, to send the carrier along a reject path 320. Preferably, the machine readable indicia 231 preferably is one of the standard machine readable bar codes such as: interleaved two of five code, three of nine code, Codabar UDC-A&E and EAM-8 and EAM-13.

The code reader 38 is coupled with the microprocessor based computer 12 of the embossed card package apparatus 10, FIG. 1, which is programmed to determine which of the different codes is being read by the reader 38, FIG. 8C. In response to the determining of the type of code being read, the microprocessor based computer 12, FIG. 1, decodes the code to identifying the information such as name, address, card account number, etc. that is printed on the read card carrier form 26A. The microprocessor 12 compares the information associated with the read bar code 231 to information associated with an embossed card 30, FIG. 1, to be inserted into the carrier form 26 to determine if there is a match. As seen in FIG. 9A, cards 30 are transported from an embosser 20 to an embossed character reader 70 and magnetic stripe reader 64 on the card transportation path. The information read from the embossed and encoded card 30 is compared by the computer 12, FIG. 1, to the machine readable indicia 294 read by the form bar code reader 38 mounted to the bursting module 36. The information read from the embossed character reader 70 and magnetic stripe reader 64, FIG. 9A, is compared by the computer 12, FIG. 1, with the information read by the carrier bar code reader 38 to determine if there is a match. The cards 30 are sent down a reject path 18 if the computer 12 determines there is no match between the read carrier information 231 and the read card information.

Referring to FIG. 9A, carrier 26 separated by cutting member 240 having read bar code information matching that of an embossed card 30 receive the cards at an inserter location 310 where card inserter 24 is located. The separated and inserted end carrier form 26A is folded, turned and sent along an end path indicated by arrows 312 and 314. The carrier forms 26A containing matching cards are sent along the end path 314 to a matching pile 316 of carrier forms. Alternatively, as seen in FIG. 9B, card carrier forms 26A are sent along a separate carrier reject path indicated by arrow 320 prior to the mounting of a card to the rejected carrier in response to the code 231 being read by the sensor reader 38 during separation of the end carrier form 26A which does not match the card information on the embossed card 30. Cards 30 having embossed and encoded information which does not match that of the corresponding carrier 26A are not inserted into the carrier. The microprocessor based computer 12, FIG. 4, signals the printer 48 to prepare a new carrier to replace the rejected carrier. The cards 30 are held at the insertion station 310 by holders 322 until the new printed carrier is fed to the insertion station. The cards 30 are inserted into the new carrier having matching information. The rejected carrier is subsequently folded and pivotally turned. However, instead of traveling down the end path 314, the nonmatching carriers are rejected and sent along the reject path 320 of FIG. 9B by transporting pin 324. The nonmatching carrier forms are prevented from being inserted with the matching carriers at the matching pile 316.

For further details covering other aspects of the embossed card package production apparatus, reference should be made to the following applications filed contemporaneously herewith and assigned to the same assignee of the present invention: U.S. patent applications Ser. Nos. 08/036,657 of Hill et al. entitled "Automatic Verified Embossed Card Package Production Methods" filed Mar. 24, 1993; Ser. No. 08/036,664 of Hill et al. entitled "Embossed Card Package System With Modular Inserters For Multiple Forms And Card Verification Apparatus" filed Mar. 24, 1993; Ser. No. 08/036,439 of Hill et al. entitled "Card Package Production System With Modular Carrier Folding Apparatus for Multiple Forms" filed Mar. 24, 1993 and Ser. No. 08/036,436 of Hill et al. entitled "Card Carrier Forms For Automated Embossed Card Package Production System" filed Mar. 24, 1993.

While a detailed description of the preferred embodiment of the invention has been given, it should be appreciated that many variations can be made thereto without departing from the scope of the invention as set forth in the appended claims.

We claim:

1. In an embossed card package production system supplied with a plurality of card carrier forms with planar bodies having opposite planar sides and having interconnected ends extending between a pair of parallel opposed side edges for receipt of corresponding cards to form card packages, the improvement being a form bursting apparatus, comprising:

an elongate, flexible cutting member with a cutting portion located intermediate a pair of end portions said end portions being held in fixed positions on respective opposite sides of said forms;

means for guiding the cutting member, said guiding means including two guide elements, with one guide element being on one of the opposite planar sides of the planar bodies, and the other guide element being on another one of the opposite planar sides of the planar bodies; and means for moving the cutting member guiding means in a direction parallel to the planar bodies and transverse to the parallel opposed side edges, said movement of the cutting member guiding means moving the intermediate cutting portion along a line through and across end ones of the plurality of interconnected card carrier forms from one of the pair of side edges to another one of the pair of side edges to separate individual card carrier forms from the plurality of interconnected card carrier forms.

2. The embossed card package production system of claim 1 including means for incrementally moving the plurality of carrier forms one carrier form at a time to a bursting station for separation by the cutting member.

3. The embossed card package production system of claim 2 in which the plurality of interconnected carrier forms have preweakened lines to facilitate separation by the cutting member, and said moving means includes means for successively moving the carrier forms to the bursting station at which the preweakened lines are aligned with the cutting member.

4. The embossed card package production system of claim 1 in which said cutting member includes a wire, and said moving means includes means for moving different parts of the wire through different parts of the interconnected card carrier forms as the moving means moves across the carrier forms.

5. The embossed card package production system of claim 1 including another cutting member, and means for mounting the other cutting member in tandem relationship with said one cutting member to provide back up cutting action in the event of failure of the one cutting member.

6. The embossed card package production system of claim 5 in which one of said cutting members is a wire, and the other cutting member is a blade mounted in cutting relationship with the interconnected carrier forms.

7. The embossed card package production system of claim 1 in which the cutting member is a wire.

8. The embossed card package production system of claim 7 in which the guiding means includes means for maintaining a taut cutting condition in the wire.

9. The embossed card package production system of claim 8 in which the taut cutting condition maintaining means includes a pair of opposed rotary members with opposing sides and between which the cutting portion wire tautly extends and about which the wire is partially wrapped.

10. The embossed card package production system of claim 1 in which said moving means includes a pair of elongate parallel spaced bars for supporting the guiding means, and means for slidably moving the guiding means along the elongate space bars.

11. The embossed card package production system of claim 1 in which the guiding means includes a rotary member, and means for adjusting the rotary member including a spring loaded plate.

12. The embossed card package production system of claim 1 in which said moving member includes a wire, means for creating tension in the wire, and means for adjusting the tension on the wire.

13. The embossed card package production system of claim 12 in which the tension adjusting means includes an adjustable spring.

14. The embossed card package production system of claim 1 including means for stabilizing the carrier forms as the cutting member moves across the plurality of interconnected carrier forms.

15. The embossed card package production system of claim 14 in which the stabilizing means includes a plurality of rollers, and means for carrying the rollers in front of the cutting member as the cutting member and the rollers move across the plurality of interconnected carrier forms.

16. The embossed card package production system of claim 1 in which said moving means includes a brake for stopping the cutting member from moving after it has cut across the plurality of interconnected carrier forms.

17. The embossed card package production system of claim 16 in which the brake is an electrical brake.

18. The embossed card package production system of claim 1 in which said moving means moves the guiding means between a home position and a distal position during a cutting cycle, and includes means for sensing when the guiding means has returned to the home position.

* * * * *